(12) United States Patent
Liu (10) Patent No.: US 11,645,735 B2
(45) Date of Patent: May 9, 2023

(54) METHOD AND APPARATUS FOR PROCESSING IMAGE, DEVICE AND COMPUTER READABLE STORAGE MEDIUM

(71) Applicant: Baidu Online Network Technology (Beijing) Co., Ltd., Beijing (CN)

(72) Inventor: Yan Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/710,678

(22) Filed: Dec. 11, 2019

(65) Prior Publication Data

US 2020/0372611 A1 Nov. 26, 2020

(30) Foreign Application Priority Data

May 20, 2019 (CN) .......................... 201910420683.9

(51) Int. Cl.
*G06T 5/00* (2006.01)
*G06T 3/40* (2006.01)
(Continued)

(52) U.S. Cl.
CPC ............ *G06T 5/002* (2013.01); *G06T 3/4053* (2013.01); *G06T 5/20* (2013.01); *G06T 5/50* (2013.01);
(Continued)

(58) Field of Classification Search
None
See application file for complete search history.

(56) References Cited

U.S. PATENT DOCUMENTS

| 2007/0092143 A1* | 4/2007 | Higgins | ............. G06K 9/00785 382/228 |
| 2008/0159632 A1* | 7/2008 | Oliver | ...................... G06K 9/64 382/209 |

(Continued)

FOREIGN PATENT DOCUMENTS

| CN | 107154023 A | 9/2017 |
| CN | 107247965 A | 10/2017 |

(Continued)

OTHER PUBLICATIONS

Sanli Tang, Xiaolin Huang, Mingjian Chen, Jie Yang, "Adversarial Attack Type I: Generating False Positives", arXiv:1809.00594v1 [cs.LG] Sep. 3, 2018. (Year: 2018).*

(Continued)

*Primary Examiner* — Jiangeng Sun
(74) *Attorney, Agent, or Firm* — Cozen O'Connor (57) ABSTRACT

According to embodiments of the present disclosure, a method and an apparatus for processing an image, a device, and a storage medium are provided. The method includes: performing an image processing operation on an initial image having a noise associated with an adversarial sample attack, to obtain an intermediate image, the image processing operation including at least one of: reducing resolution of the initial image, or smoothing at least a part of the initial image; determining an image enhancement model matching the image processing operation, the image enhancement model being trained based on a sample image and a reference image, and the reference image being obtained by performing at least the image processing operation on the (Continued)

sample image; and generating a target image by processing the intermediate image using the image enhancement model, the target image having an image quality higher than the intermediate image.

10 Claims, 4 Drawing Sheets

(51) Int. Cl.
*G06T 5/20* (2006.01)
*G06T 5/50* (2006.01)

(52) U.S. Cl.
CPC ........... *G06T 2207/20028* (2013.01); *G06T 2207/20032* (2013.01); *G06T 2207/20081* (2013.01); *G06T 2207/30252* (2013.01)

(56) References Cited

U.S. PATENT DOCUMENTS

| | | | | |
|---|---|---|---|---|
| 2012/0233841 | A1* | 9/2012 | Stein | G03B 17/02 29/428 |
| 2018/0075581 | A1* | 3/2018 | Shi | G06N 3/0472 |
| 2018/0357537 | A1* | 12/2018 | Munkberg | G06N 3/084 |
| 2019/0130530 | A1* | 5/2019 | Schroers | G06T 3/4046 |
| 2019/0295721 | A1* | 9/2019 | Madabhushi | G16H 30/40 |
| 2019/0302290 | A1* | 10/2019 | Alwon | G01V 1/364 |
| 2019/0303720 | A1* | 10/2019 | Karam | G06K 9/6262 |
| 2019/0354847 | A1* | 11/2019 | Rasch | G06N 3/084 |
| 2019/0370608 | A1* | 12/2019 | Lee | G06T 3/4053 |
| 2020/0034948 | A1* | 1/2020 | Park | A61N 5/1039 |
| 2020/0074234 | A1* | 3/2020 | Tong | G06K 9/6267 |

FOREIGN PATENT DOCUMENTS

| | | |
|---|---|---|
| CN | 107767343 A | 3/2018 |
| CN | 107886527 A | 4/2018 |
| CN | 108182669 A | 6/2018 |
| CN | 109035142 A | 12/2018 |
| CN | 109285182 A | 1/2019 |
| CN | 109325931 A | 2/2019 |
| CN | 109377459 A | 2/2019 |
| CN | 109671022 A | 4/2019 |

OTHER PUBLICATIONS

Ledig et al., Photo-Realistic Single Image Super-Resolution Using a Generative Adversarial Network, arXiv:1609.04802, Sep. 15, 2016, 14 pages.
Image Super Resolution Reconstruction or Restoration Based on Srgan, https://blog.csdn.net/Gavinmiaoc/article/details/80016051, Apr. 20, 2018, 5 pages.
Du Yanpu, Research on Super Resolution Method of Remote Sensing Image Based on Generative Adversarial Network, http://www.cmfd.cnki.net/Journal/Issue.aspx?dbCode=CMFD&PYKM=CCCM&Year=2019 &Issue=01&Volume=01&QueryID=10, Dec. 16, 2018, 12 pages.
Chinese Patent Application No. 201910420683.9, Office Action dated Mar. 12, 2021, 7 pages.

* cited by examiner

METHOD AND APPARATUS FOR PROCESSING IMAGE, DEVICE AND COMPUTER READABLE STORAGE MEDIUM

CROSS-REFERENCE TO RELATED APPLICATIONS

This application claims priority to Chinese Patent Application No. 201910420683.9, filed on May 20, 2019, titled "Method and Apparatus for Processing Image, Device and Computer Readable Storage Medium," which is hereby incorporated by reference in its entirety.

TECHNICAL FIELD

Embodiments of the present disclosure relate to the computer field, and more specifically to a method and apparatus for processing an image, a device and a computer readable storage medium.

BACKGROUND

With the development of artificial intelligence, an neural-network-based image recognition model is more and more applied to various aspects of life. For example, an autonomous driving vehicle may acquire the information about a surrounding environment using the neural-network-based image recognition model, for assisting making a decision of vehicle driving.

However, some disturbances or noises unperceivable to human eyes may cause a great influence on the accuracy of the image recognition model. Such an input sample is often referred to as an adversarial sample. Therefore, how to reduce the influence of the noise associated with an adversarial sample attack on the image recognition model becomes the current focus of attention.

SUMMARY

According to embodiments of the disclosure, a scheme of processing an image is provided.

In an aspect of the disclosure, a method for processing an image is provided. The method includes: performing an image processing operation on an initial image having a noise associated with an adversarial sample attack, to obtain an intermediate image, the image processing operation including at least one of: reducing resolution of the initial image, or smoothing at least a part of the initial image; determining an image enhancement model matching the image processing operation, the image enhancement model being trained based on a sample image and a reference image, and the reference image being obtained by performing at least the image processing operation on the sample image; and generating a target image by processing the intermediate image using the image enhancement model, the target image having an image quality higher than the intermediate image.

In a second aspect of the disclosure, an apparatus for processing an image is provided. The apparatus includes a processing module, configured to perform an image processing operation on an initial image having a noise associated with an adversarial sample attack, to obtain an intermediate image, the image processing operation including at least one of: reducing resolution of the initial image, or smoothing at least a part of the initial image; a model determining module, configured to determine an image enhancement model matching the image processing operation, the image enhancement model being trained based on a sample image and a reference image, and the reference image being obtained by performing at least the image processing operation on the sample image; and a generating module, configured to generate a target image by processing the intermediate image using the image enhancement model, the target image having an image quality higher than the intermediate image.

In a third aspect, an electronic device is provided. The electronic device includes one or more processors; and a storage device, configured to store one or more programs, wherein the one or more programs, when executed by the one or more processors, cause the electronic device to implement the method according to the first aspect of the disclosure.

In a fourth aspect, a computer readable storage medium is provided. The computer readable storage medium stores a computer program, where the program, when executed by a processor, implements the method according the first aspect of the disclosure.

It should be understood that the content described in the summary section of the disclosure is not intended to limit the key or important features of the embodiments of the present disclosure, nor is it intended to limit the scope of the present disclosure. Other features of the present disclosure will become easily understood by the following description.

BRIEF DESCRIPTION OF THE DRAWINGS

The above and other features, objectives and aspects of the present disclosure will become more apparent in combination with the accompanying drawings and with reference to the following detailed descriptions. In the accompanying drawings, the same or similar reference numerals denote the same or similar elements, where.

DETAILED DESCRIPTION OF EMBODIMENTS

Embodiments of the present disclosure will be described below in more detail with reference to the accompanying drawings. Although certain embodiments of the present disclosure are shown in the accompanying drawings, it should be appreciated that the present disclosure may be implemented in various forms, and should not be construed as being limited to the embodiments described herein. In contrast, the embodiments are provided for a more thorough and complete understanding of the present disclosure. It should be understood that the accompanying drawings and the embodiments of the present disclosure are only used for illustration, and are not used to limit the scope of protection of the present disclosure.

In the descriptions for the embodiments of the present disclosure, the term "include" and similar terms should be understood as open-ended, that is, "including but not limited to." The term "based on" should be understood as "at least partially based on." The term "an embodiment" or "the embodiment" should be understood as "at least one embodiment." The terms "first," "second" and the like may refer to different or identical objects. Other explicit and implicit definitions may also be included below.

As discussed above, a neural-network-based image recognition model has been widely applied in various areas of life. However, an adversarial sample attack has become a challenge faced by the image recognition model. In the adversarial sample attack, some noises unperceivable to human eyes may cause the image recognition model to make a misjudgement, and thus, the correct information cannot be accurately acquired from an image. The misjudgement is often unacceptable in many areas. For example, in the image-recognition-based automatic driving perception area, once a misjudgement for the traffic environment is made due to the adversarial sample attack, a wrong driving decision may be caused, resulting in an unpredictable consequence.

According to an embodiment of the present disclosure, a scheme for processing an image is provided. In this scheme, an image processing operation is first performed on an initial image having a noise associated with the adversarial sample attack, to obtain an intermediate image, the image processing operation including at least one of: reducing resolution of the initial image, or smoothing at least a part of the initial image. Subsequently, an image enhancement model matching the image processing operation is determined, the image enhancement model being trained based on a sample image and a reference image, and the reference image being obtained by performing at least the image processing operation on the sample image. Then, a target image is generated by processing the intermediate image using the image enhancement model, the target image having an image quality higher than the intermediate image. According to the scheme of the present disclosure, the noise associated with the adversarial sample attack and contained in the initial image is reduced by performing a resolution reduction and/or filtering on the initial image, and the target image having the higher image quality is further generated using the image enhancement model. In this way, the scheme of the present disclosure can defend against the adversarial sample attack while reducing affections on the image quality.

Figure 1:
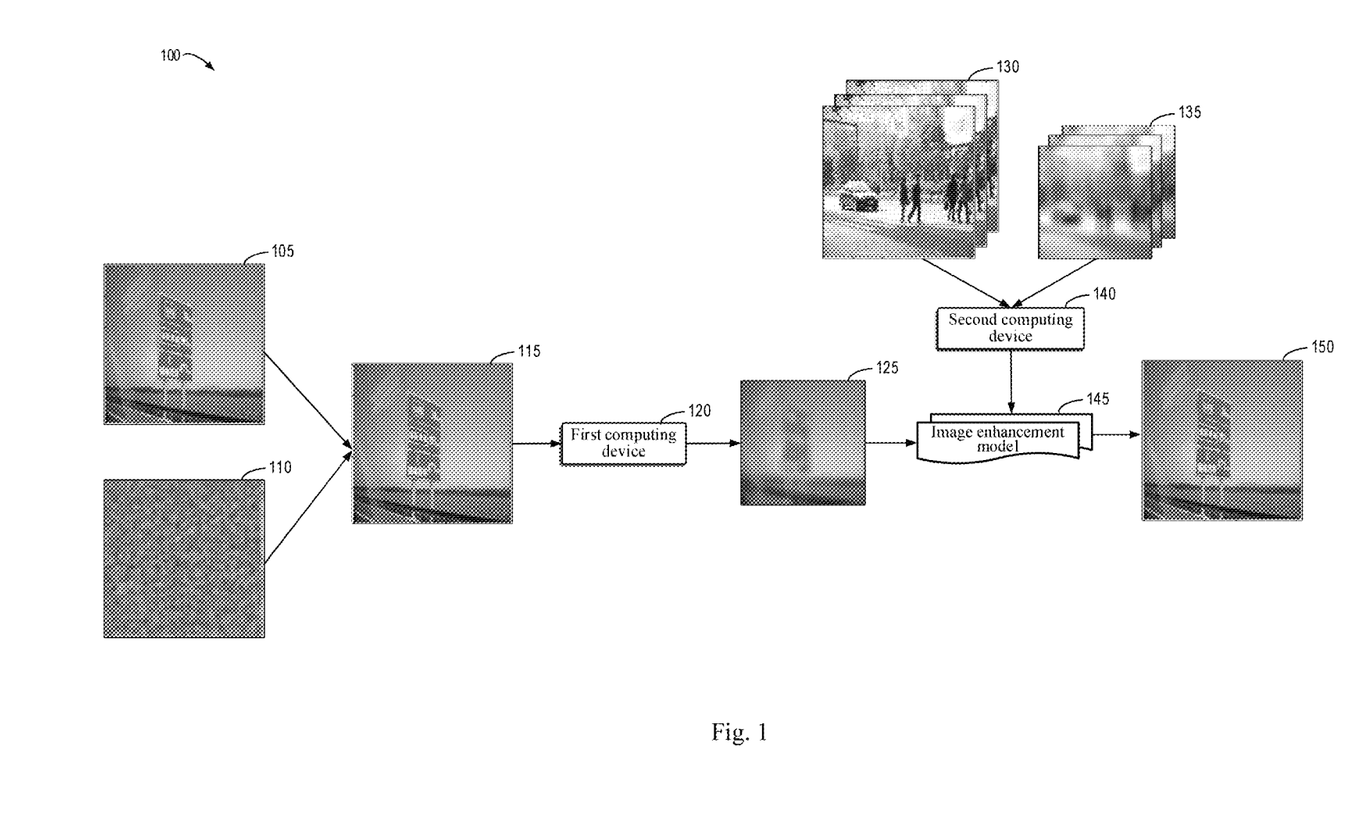
FIG. 1 is a schematic diagram of an example environment in which a plurality of embodiments of the present disclosure can be implemented.

Embodiments of the present disclosure will be specifically described below with reference to the accompanying drawings. FIG. 1 is a schematic diagram of an example environment 100 in which a plurality of embodiments of the present disclosure can be implemented. In the example environment 100, a first computing device 120 may receive an initial image 115. In an embodiment of the present disclosure, the initial image 115 may be synthesized by a normal image 105 and a noise 110, that is, the initial image 115 has the noise 110 associated with an adversarial sample attack. In some embodiments, the noise 110 may originally exist in a traffic environment, for example, the noise is a mosaic affixed onto a normal traffic sign. Alternatively, such noise 110 may alternatively be manually added before being transmitted to the first computing device 120.

As shown in FIG. 1, after receiving the initial image 115, the first computing device 120 may perform a particular image processing operation on the initial image 115, to obtain an intermediate image 125. For example, the first computing device 120 may reduce the resolution of the initial image 115 or smooth at least a part of the initial image 115. Such an operation may facilitate filtering the noise 110 contained in the initial image 115.

The first computing device 120 may further determine, from one or more image enhancement models 145, an image enhancement model 145 matching the performed image processing operation. As shown in FIG. 1, the image enhancement model 145 may be obtained through training by a second computing device 140 using a received sample image 130 and a reference image 135 obtained by performing the image processing on the sample image 130. Through the training, the image enhancement model 145 can have the capability of generating an image of a high quality (e.g., an image having high resolution or a clearer image) based on a low-quality image after the image processing (e.g., an image having low resolution or a blurred image). It should be understood that the capability of the image enhancement model 145 is determined based on an inputted sample pair.

Depending on the inputted sample pair, the image enhancement model 145 may only have the capability of improving the resolution, only have the capability of sharpening the image, or have the capability of improving the resolution and the capability of sharpening the image at the same time. The first computing device 120 may determine the image enhancement model 145 matching the image processing operation based on the specific image processing operation used in generating the intermediate image 125.

As shown in FIG. 1, the first computing device 120 may further input the intermediate image 125 into the determined image enhancement model 145, and obtain a target image 150 using the image enhancement model 145. Here, the target image 150 has an image quality higher than the intermediate image 125.

Only for illustration, in FIG. 1, the first computing device 120 and the second computing device 140 are shown as separate blocks. It may be appreciated by those skilled in the art that the functions described based on these devices may be achieved using a physically combined processing apparatus or distributed processing apparatuses, and the specific implementations are not limited in the present disclosure.

Figure 2:
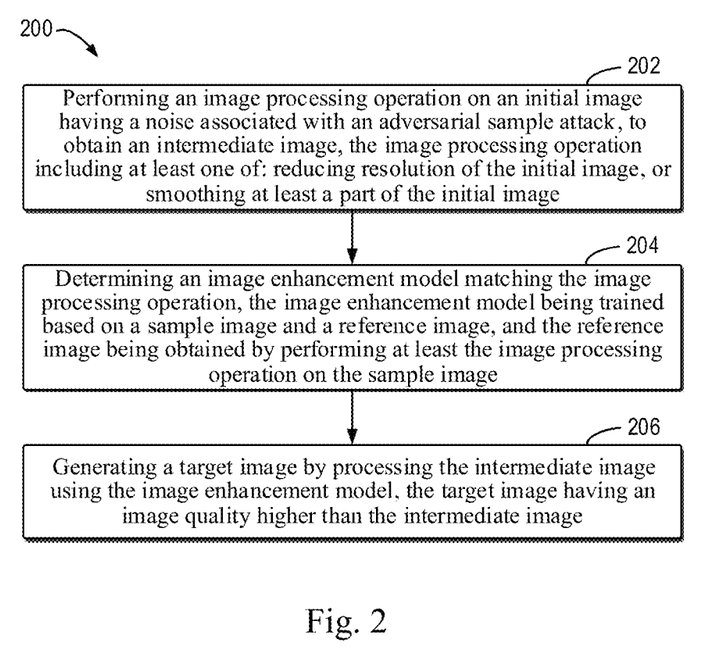
FIG. 2 is a flowchart of a process of processing an image according to an embodiment of the present disclosure.
Figure 3:
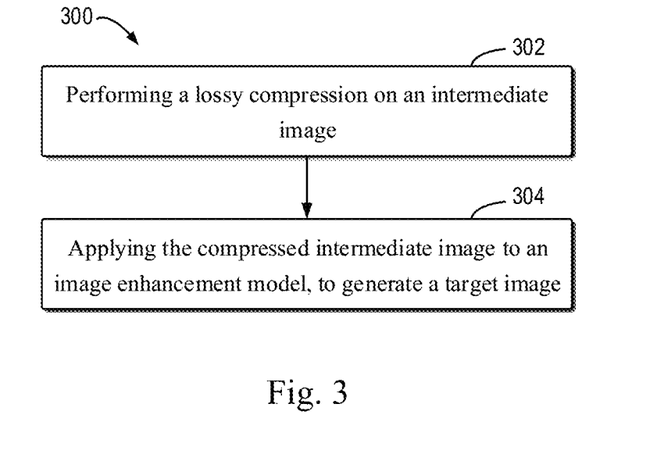
FIG. 3 is a flowchart of a process of generating a target image according to an embodiment of the present disclosure.

A process of training a lane line recognition model will be described below in more detail with reference to FIGS. 2 and 3. FIG. 2 is a flowchart of a process 200 of processing an image according to some embodiments of the present disclosure. The process 200 may be implemented by the first computing device 120 in FIG. 1. For ease of discussion, the process 200 will be described in combination with FIG. 1.

At block 202, the first computing device 120 performs the image processing operation on the initial image 115 having the noise 110 associated with the adversarial sample attack, to obtain the intermediate image 125. Here, the image processing operation includes at least one of: reducing the resolution of the initial image 115, or smoothing the at least a part of the initial image 115.

As described above, in some embodiments, the first computing device 120 may directly acquire the initial image 115 having the adversarial sample noise 110 through an image collection device, for example, the noise may refer to some mosaics pasted in a real-world scene.

Alternatively, the noise 110 may alternatively be added later to the normal image 105 acquired by the image collection device.

In some embodiments, the acquired initial image 115 may be associated with the surrounding environment of a vehicle, and the first computing device 120 may be a vehicle-mounted computing device or a road-side computing device. For example, the first computing device 120 may obtain the initial image 115 through a vehicle-mounted camera, or may accept the initial image 115 having the noise 110 by means of a network.

In order to reduce the noise 110 contained in the initial image 115, the first computing device 120 may further perform a predetermined image processing operation on the initial image 115. Specifically, the first computing device 120 may reduce the resolution of the initial image 115. For example, the resolution of the initial image 115 may be reduced to a quarter of the original resolution. Alternatively or additionally, the first computing device 120 may smooth the at least a part of the initial image 115. Specifically, the first computing device 120 may process the at least a part of the initial image 115 using at least one of: a box filter, a mean filter, a Gaussian filter, a median filter or a bilateral filtering guided filter. In a specific example, when smoothing filtering is performed using the Gaussian filter, the first computing device 120 may set the size of a filtered window to a range from 3 to 13. In some embodiments, the first computing device 120 may perform both the two kinds of image processing operations. For example, the first computing device 120 may first reduce the resolution of the initial image 115, and then perform the smoothing operation on the image obtained by reducing the resolution.

At block 204, the first computing device 120 determines the image enhancement model 145 matching the image processing operation. Here, the image enhancement model 145 is trained based on the sample image 130 and the reference image 135, and the reference image is obtained by performing at least the image processing operation on the sample image. Specifically, depending on the specific image processing operation, the first computing device 120 may acquire the image enhancement model 145 matching the image processing operation.

For example, when obtaining the intermediate image 125 by reducing the resolution, the first computing device 120 may acquire the image enhancement model 145 corresponding to the operation of reducing the resolution. Here, the image enhancement model 145 is trained based on the sample image 130 and the reference image 135 obtained by reducing the resolution of the sample image 130.

In another example, for obtaining the intermediate image 125 by performing the smoothing operation, the first computing device 120 may acquire the image enhancement model 145 corresponding to the smoothing operation. Here, the image enhancement model 145 is trained based on the sample image 130 and the reference image 135 obtained by performing the smoothing operation on the sample image 130.

In some embodiments, the image enhancement model 145 is a super-resolution generative adversarial network (SRGAN). When the process 200 is applied in a traffic scene, the second computing device 140 may train the image enhancement model 145 through the sample image 130 and the reference image 135 associated with the traffic scene (e.g., a road sign and a traffic light). In some embodiments, the image enhancement model 145 is trained, such that the difference between the output image generated by the image enhancement model 145 based on the reference image 135, and the sample image 130 is less than a predetermined threshold, such that the trained image enhancement model 145 has the capability of converting the image having the low image quality on which the image processing is performed (e.g., the image having low resolution and low definition) into the image having the high image quality.

At block 206, the first computing device 120 generates the target image 150 by processing the intermediate image 125 using the image enhancement model 145. Here, the target image 150 has the image quality higher than the intermediate image 125.

In some embodiments, the first computing device 120 may process the intermediate image 125 using the image enhancement model 145. In some examples, the image enhancement model 145 may be deployed locally in the first computing device 120, such that the first computing device 120 may directly input the intermediate image 125 to the local image enhancement model 145, to generate the target image 150. In another example, the image enhancement model 145 may be deployed in another computing device (e.g., a cloud computing device). The first computing device 120 may send the intermediate image 125 to, for example, the cloud computing device, such that the cloud computing device can run the image enhancement model 145 to generate the target image 150 based on the intermediate image 125, and send the target image 150 back to the first computing device 120.

In some embodiments, the image enhancement model 145 may be the super-resolution generative adversarial network (SRGAN), to be used for generating the target image 150 having the higher image quality based on the intermediate image 125 having the lower image quality.

In some embodiments, the first computing device 120 may further perform a lossy compression on the intermediate image to perform the process of generating the target image 150. The process of block 206 will be described below in combination with FIG. 3. FIG. 3 is a flowchart of a process of generating a target image according to an embodiment of the present disclosure. As shown in FIG. 3, at block 302, the first computing device 120 performs the lossy compression on the intermediate image 125. In some embodiments, in general, the intermediate image 125 may be in PNG format, and the first computing device 120 may perform the lossy compression on the intermediate image 125. For example, the intermediate image 125 may be stored in JPEG mode. Through the lossy compression, the first computing device 120 may further remove the noise 110 contained in the image.

At block 304, the first computing device 120 applies the compressed intermediate image to the image enhancement model 145 to generate the target image 150. For example, when the image enhancement model 145 is the super-resolution generative adversarial network (SRGAN), the first computing device 120 may input the compressed intermediate image into the image enhancement model 145, to generate the target image 150 having the higher quality based on the intermediate image.

Based on this approach, according to the embodiments of the present disclosure, the noise associated with the adversarial sample attack and included in the original image may first be reduced through the image processing operation, and the quality of the image is further improved through the image enhancement model to obtain the target image having the higher image quality. The target image obtained in this way has both less noise and an image quality sufficient to support the image recognition, and thus can defend against the adversarial sample attack while reducing the affections on the image quality as much as possible. In some embodiments, when an embodiment of the present disclosure is used in a scene related to vehicle driving, that is, the obtained initial image 115 is an image related to the environment of the vehicle, the method 200 may further include providing the target image 150 to the vehicle. For example, the first computing device 120 may provide the target image 150 to a decision module of the vehicle to make a decision to drive the vehicle based on the perceptual information obtained from the target image 150. In another example, the first computing device 120 may alternatively provide the target image 150 to, for example, a roadside device to acquire the perceptual information from the target image 150. The perceptual information may be sent to the vehicle. Alternatively, the roadside device may determine the vehicle driving decision based on the perceptual information and send the decision to the vehicle to be used for driving control of the vehicle.

Figure 4:
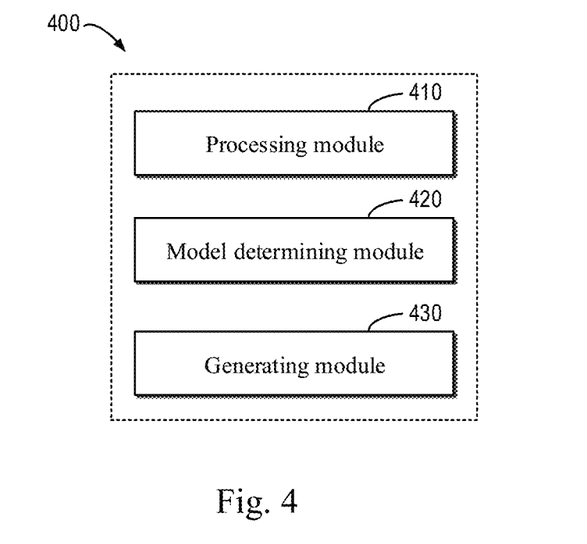
FIG. 4 is a schematic block diagram of an apparatus for recognizing an image according to an embodiment of the present disclosure.

FIG. 4 is a schematic block diagram of an apparatus 400 for training a lane line recognition model according to an embodiment of the present disclosure. The apparatus 400 may be included in the first computing device 120 of FIG. 1 or implemented as the first computing device 120. As shown in FIG. 4, the apparatus 400 includes a processing module 410, configured to perform an image processing operation on an initial image having a noise associated with an adversarial sample attack, to obtain an intermediate image, the image processing operation including at least one of: reducing resolution of the initial image, or smoothing at least a part of the initial image. The apparatus 400 further includes a model determining module 420, configured to determine an image enhancement model matching the image processing operation, the image enhancement model being trained based on a sample image and a reference image, and the reference image being obtained by performing at least the image processing operation on the sample image. In addition, the apparatus 400 further includes a generating module 430, configured to generate a target image by processing the intermediate image using the image enhancement model, the target image having an image quality higher than the intermediate image.

In some embodiments, the generating module 430 includes: a compressing module, configured to perform a lossy compression on the intermediate image; and a model applying module, configured to apply the compressed intermediate image to the image enhancement model, to generate the target image.

In some embodiments, the apparatus 400 further includes: an acquiring module, configured to acquire the initial image, the initial image being associated with a surrounding environment of a vehicle; and a providing module, configured to provide the target image to the vehicle.

In some embodiments, the smoothing at least a part of the initial image includes: processing the at least a part of the initial image using at least one of: a box filter, a mean filter, a Gaussian filter, a median filter or a bilateral filtering guided filter.

In some embodiments, the image enhancement model is trained, to make a difference between an output image generated based on the reference image by the image enhancement model and the sample image less than a predetermined threshold.

In some embodiments, the image enhancement model is a super-resolution generative adversarial network.

Figure 5:
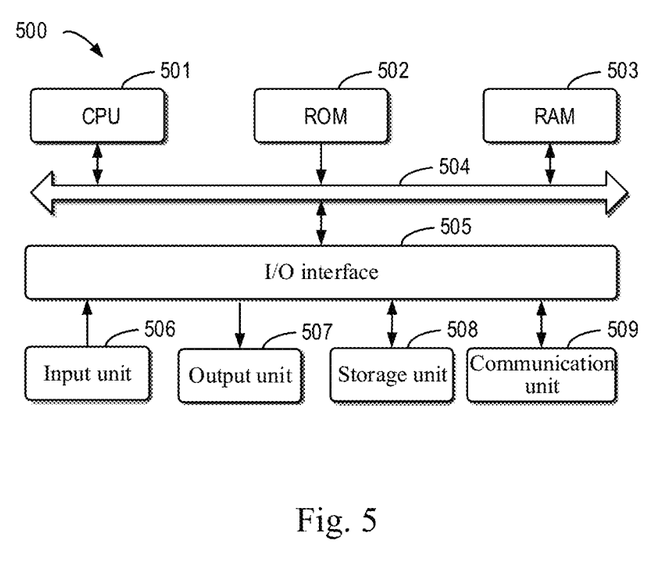
FIG. 5 is a block diagram of a computing device capable of implementing a plurality of embodiments of the present disclosure.

FIG. 5 is a schematic block diagram of an example device 500 that may be used to implement embodiments of the present disclosure. The device 500 may be used to implement the first computing device 120 and/or the second computing device 140 of FIG. 1. As shown in FIG. 5, the device 500 includes a central processing unit (CPU) 501, which may execute various appropriate actions and processes in accordance with a computer program instruction stored in a read-only memory (ROM) 502 or a computer program instruction loaded into a random access memory (RAM) 503 from a storage unit 508. The RAM 503 may further store various programs and data required by operations of the device 500. The CPU 501, the ROM 502 and the RAM 503 are connected to each other through a bus 504. An input/output (I/O) interface 505 is also connected to the bus 504.

A plurality of components in the device 500 are connected to the I/O interface 505, the components including: an input unit 506 such as a keyboard and a mouse; an output unit 507 such as various types of displays and various types of speakers; a storage unit 508 such as a magnetic disc and an optical disc; and a communication unit 509 such as a network interface card, a modem and a wireless communication transceiver. The communication unit 509 allows the device 500 to exchange information/data with other devices through a computer network such as the Internet and/or various telecommunication networks.

The processing unit 501 performs various methods and processes described above, for example, the process 200. For example, in some embodiments, the process 200, the method 300 and/or the apparatus 400 may be implemented as a computer software program tangibly contained in a machine readable medium, for example, the storage unit 508. In some embodiments, a computer program may be loaded and/or installed onto the device 500 in part or whole through the ROM 502 and/or the communication unit 509. The computer program, when loaded to the RAM 503 and executed by the CPU 501, may perform one or more steps of the process 200 described above. Alternatively, in other embodiments, the CPU 501 may be configured to perform the process 200 by any other suitable means (e.g., by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various operations are described in a specific order, this should not be understood that such operations are required to be performed in the specific order shown or in sequential order, or all illustrated operations should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for processing an image, the method comprising:
    performing an image processing operation on an initial image having a noise of a mosaic pattern associated with an adversarial sample attack, to obtain an intermediate image, the image processing operation including: first reducing the resolution of the initial image to obtain an image with reduced resolution, and then performing a smoothing on the image with reduced resolution;
    determining an image enhancement model matching the image processing operation, wherein the image enhancement model is obtained by training using a reference image as an input until a difference between a resolution or definition of an output of the image enhancement model and a resolution or definition of a sample image is smaller than a threshold, wherein the reference image is obtained by performing the image processing operation on the sample image, and the sample image is a noisy image comprising an object blocked by a mosaic; and
    generating a target image by processing the intermediate image using the image enhancement model, the target image having an image quality higher than the intermediate image,
    wherein the smoothing the image with reduced resolution includes:
    processing the image with reduced resolution using a Gaussian filter, a size of a filtered window of the Gaussian filter being set to a range from 3 to 13.

2. The method according to claim 1, wherein the generating a target image comprises:
    performing a lossy compression on the intermediate image; and
    applying the compressed intermediate image to the image enhancement model, to generate the target image.

3. The method according to claim 1, wherein the method further comprises: acquiring the initial image, the initial image being associated with a surrounding environment of a vehicle; and
    providing the target image to the vehicle.

4. The method according to claim 1, wherein the image enhancement model is a super-resolution generative adversarial network.

5. An apparatus for processing an image, the apparatus comprising:
    at least one processor; and
    a memory storing instructions, wherein the instructions when executed by the at least one processor, cause the at least one processor to perform operations, the operations comprising:
    performing an image processing operation on an initial image having a noise of a mosaic pattern associated with an adversarial sample attack, to obtain an intermediate image, the image processing operation including: first reducing the resolution of the initial image to obtain an image with reduced resolution, and then performing a smoothing on the image with reduced resolution;
    determining an image enhancement model matching the image processing operation, wherein the image enhancement model is obtained by training using a reference image as an input until a difference between a resolution or definition of an output of the image enhancement model and a resolution or definition of a sample image is smaller than a threshold, wherein the reference image is obtained performing the image processing operation on the sample image, and the sample image is a noisy image comprising an object blocked by a mosaic; and
    generating a target image by processing the intermediate image using the image enhancement model, the target image having an image quality higher than the intermediate image,
    wherein the smoothing the image with reduced resolution includes:
    processing the image with reduced resolution using a Gaussian filter, a size of a filtered window of the Gaussian filter being set to a range from 3 to 13.

6. The apparatus according to claim 5, wherein the generating a target image comprises:
    performing a lossy compression on the intermediate image; and
    applying the compressed intermediate image to the image enhancement model, to generate the target image.

7. The apparatus according to claim 5, wherein the operations further comprise:
    acquiring the initial image, the initial image being associated with a surrounding environment of a vehicle; and
    providing the target image to the vehicle.

8. The apparatus according to claim 5, wherein the image enhancement model is a super-resolution generative adversarial network.

9. A non-transitory computer readable storage medium, storing a computer program, wherein the program, when executed by a processor, causes the processor to perform operations, the operations comprising:
    performing an image processing operation on an initial image having a noise of a mosaic pattern associated with an adversarial sample attack, to obtain an intermediate image, the image processing operation including: first reducing the resolution of the initial image to obtain an image with reduced resolution, and then performing a smoothing on the image with reduced resolution;
    determining an image enhancement model matching the image processing operation, wherein the image enhancement model is obtained by training using a reference image as an input until a difference between a resolution or definition of an output of the image enhancement model and a resolution or definition of a sample image is smaller than a threshold, wherein the reference image is obtained by performing the image processing operation on the sample image, and the sample image is a noisy image comprising an object blocked by a mosaic; and generating a target image by processing the intermediate image using the image enhancement model, the target image having an image quality higher than the intermediate image, wherein the smoothing the image with reduced resolution includes:

processing the image with reduced resolution using a Gaussian filter, a size of a filtered window of the Gaussian filter being set to a range from 3 to 13.

10. The method according to claim 1, wherein the noisy image comprising the object blocked by the mosaic is an image comprising a traffic sign blocked by the mosaic.

* * * * *